US007406377B2

(12) United States Patent
Shiga

(10) Patent No.: US 7,406,377 B2
(45) Date of Patent: Jul. 29, 2008

(54) VEHICLE-USE AUTOMATIC OPENING/CLOSING DEVICE

(75) Inventor: Naohiko Shiga, Kiryu (JP)

(73) Assignee: Mitsuba Corporation, Gunma (JP)

( * ) Notice: Subject to any disclaimer, the term of this patent is extended or adjusted under 35 U.S.C. 154(b) by 141 days.

(21) Appl. No.: 10/526,710

(22) PCT Filed: Sep. 12, 2003

(86) PCT No.: PCT/JP03/11708

§ 371 (c)(1),
(2), (4) Date: Nov. 15, 2005

(87) PCT Pub. No.: WO2004/025063

PCT Pub. Date: Mar. 25, 2004

(65) Prior Publication Data

US 2006/0150515 A1 Jul. 13, 2006

(30) Foreign Application Priority Data

Sep. 12, 2002 (JP) ............................ 2002-266312

(51) Int. Cl.
*G06F 17/00* (2006.01)
*G05B 9/02* (2006.01)

(52) U.S. Cl. ........................................ 701/49; 318/282

(58) Field of Classification Search .................. 701/36, 701/49, 67, 68; 318/280, 282, 283, 286, 318/466, 468; 49/29, 31, 324, 360
See application file for complete search history.

(56) References Cited

U.S. PATENT DOCUMENTS 4,916,861 A * 4/1990 Schap .......................... 49/31

(Continued)

FOREIGN PATENT DOCUMENTS

| | | |
|---|---|---|
| JP | 10193978 | 7/1998 |
| JP | 10-280805 | 10/1998 |
| JP | 10317795 | 12/1998 |

OTHER PUBLICATIONS

PCT International Search Report for Serial No. PCT/JP2003/011708 dated Sep. 12, 2002.

*Primary Examiner*—Jack W Keith
*Assistant Examiner*—Edward Pipala
(74) *Attorney, Agent, or Firm*—McCormick, Paulding & Huber LLP

(57) ABSTRACT

When a slide door stops at an intermediate position over a protection action time start time (Tβ), an electric motor is operated in closing direction in low driving force mode. When the move speed (Vc) of the slide door is a movable speed (Vα) or higher, the slide door is moved to its fully closed position by automatic closing action, and an electromagnetic clutch is disconnected. On the other hand, when the move speed (Vc) of the slide door is not made to reach the movable speed (Vα) or higher over a speed judgment time (Tj), the electric motor is operated in closing direction in the low driving force mode, and when the move speed (Vo) of the slide door is made to reach the movable speed (Vα) or higher, the slide door is automatically opened. Further, when the move speed (Vo) of the slide door is made to reach the movable speed (Vα) or higher for the speed judgment time (Tj), the electric motor is stopped, and the electromagnetic clutch is made into its disconnected status.

8 Claims, 8 Drawing Sheets

U.S. PATENT DOCUMENTS 5,789,887 A * 8/1998 Elischewski ................ 318/468
5,892,340 A * 4/1999 Sasajima et al. ............ 318/293
6,037,727 A * 3/2000 Kawanobe et al. .......... 318/286
6,178,699 B1 1/2001 Kawanobe et al. ............ 49/360
6,226,925 B1 * 5/2001 Shimura et al. ............... 49/360
6,594,567 B2 * 7/2003 Zhou et al. .................... 701/36

* cited by examiner

VEHICLE-USE AUTOMATIC OPENING/CLOSING DEVICE

CROSS-REFERENCE TO RELATED APPLICATIONS

This application is entitled to the benefit of and incorporates by reference essential subject matter disclosed in International Patent Application No. PCT/JP2003/011708 filed on Sep. 12, 2003 and Japanese Patent Application No. 2002-266312 filed on Sep. 12, 2002.

TECHNICAL FILED OF THE INVENTION

The present invention relates to an automatic open-close device for a vehicle that automatically opens and closes an open-close component arranged to the vehicle, more specifically, it relates to a technology advantageous when applied to opening and closing a slide door.

BACKGROUND OF THE INVENTION

As an open-close component arranged to a vehicle such as an automobile, a slide door that opens and closes in sliding manners along a guide rail is known. For example, in many wagons and station wagons, slide doors are arranged at their sides for passengers' getting on and off and loading and unloading cargos into and from vehicle sides.

This slide door has small opening space required for opening and closing, and is frequently applied for a relatively large opening portion, and a slide door itself tends to become of a larger size. Therefore, the weight of the slide door becomes heavy, and in some cases, it is difficult for a woman or a child to freely open and close it. Especially, on a slope, the slide door will not easily open owing to its own weight, or it will close abruptly, which has been a problem with the prior art. Therefore, under circumstances of increased family uses of station wagons and the likes, vehicles loaded with an automatic open-close device of a slide door that may be opened and closed easily by a women and a child have been released, and the number thereof is increasing for their convenience. As this automatic open-close device, one having a drum around which a cable attached to a slide door is wound, and an electric motor that rotates this drum is known, and by rotating the electric motor in normal and reverse directions, the slide door is automatically opened and closed.

Further, even for vehicles loaded with the automatic open-close device, there is a request for using manual open-close operation together. However, because a gear deceleration mechanism that decelerates the output of the electric motor is arranged between the electric motor and the drum, when the slide door is moved manually, the electric motor is also rotated via a deceleration gear, and resistance working on the slide door becomes large, and the open-close operation becomes heavy. Therefore, an electromagnetic clutch is arranged between the gear deceleration mechanism and the drum, and when the slide door stops in its fully opened status or fully closed status, this electromagnetic clutch is cut off, and a manual open-close operation may be carried out.

In such an automatic open-close device, when the electromagnetic clutch is disconnected, the drum will rotate easily, accordingly, when the slide door is stopped at the intermediate position between its fully opened position and fully closed position, if the electromagnetic clutch is disconnected, in the instance when a vehicle is inclined, the slide door will open and close abruptly owing to its own weight, which is dangerous. Therefore, in one disclosed in Patent Application Laid-Open Publication No. 10-317795 Gazette, when the slide door is stopped in its intermediate position, the electromagnetic clutch is made into its connected status, thereby the slide door is prevented from abruptly opening or closing on a slope or so. However, because the electromagnetic clutch is kept at its connected status when current is supplied from a battery, if the slide door is stopped at the intermediate position for a long time, the battery burden increases, and in some cases, the battery is apt to become dead, which has been other problem with the prior art.

Meanwhile, as disclosed in Patent Application Laid-Open Publication No. 10-193978 Gazette, an automatic open-close device is known where when the slide door stops halfway, the electromagnetic clutch is controlled intermittently and the slide door is moved to the open-close end portion and the electromagnetic clutch is switched to its disconnected status. However, in this instance, when the electromagnetic clutch is connected and disconnected, abrasion of the clutch surface is facilitated, and sounds occur owing to intermittent operation of the clutch, and electric noises occur, which has been still other problem with the prior art.

SUMMARY OF THE INVENTION

Accordingly, the object of the present invention is to improve the operational feeling of an automatic open-close device for a vehicle.

The other object of the present invention is to reduce the burden of a battery by an automatic open-close device for a vehicle.

According to the present invention, actions of the open-close component that stops at its intermediate position are controlled according to the inclined status of a vehicle, therefore, it is possible to improve the operational feeling thereof, without causing uncomfortable feeling to passengers and the likes.

Further, according to the present invention, even when the driving unit is operated by low driving force to one direction of either its opening direction or its opening direction, if the open-close component fails to reach a specified speed within a specified time, the driving unit is operated by low driving force to the other side of either its opening direction or its closing direction, therefore, even when the vehicle is inclined with either side in the open-close direction of the open-close component as a downward side, it is possible to move the open-close component toward the downward side of the inclination.

Furthermore, according to the present invention, when the vehicle is at level, the driving unit is stopped with the open-close component at its intermediate position, therefore, it is possible to prevent the open-close component from being automatically moved even when the vehicle is at level, and to improve the operational feeling of this automatic open-close device for a vehicle.

Moreover, according to the present invention, the open-close component that stops at its intermediate position over a specified time does not move owing to its own weight irrespective of the inclined status of the vehicle, and the clutch is disconnected after being controlled according to the inclined status of the vehicle, therefore, it is possible to reduce the burden of a battery.

Still further, according to the present invention, the clutch is disconnected after being controlled according to the inclined status of the vehicle, therefore, it is possible to prevent abrasion of the clutch surface, sounds, and electric noises from occurring.

DETAILED DESCRIPTION OF THE PREFERRED EMBODIMENTS

Figure 1:
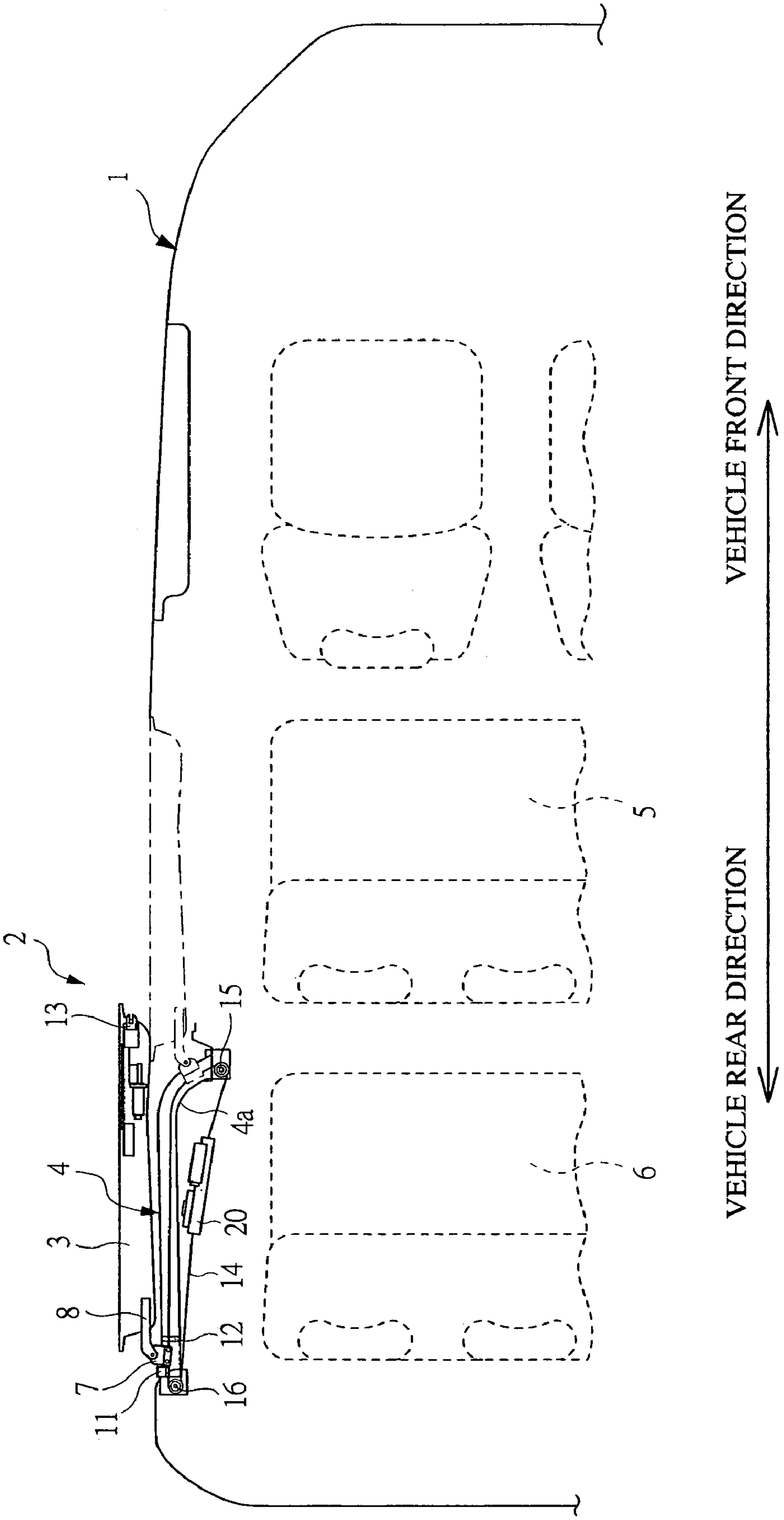
FIG. 1 is an explanatory figure showing a vehicle where a power slide door device as a preferred embodiment according to the present invention.

As shown in FIG. 1, in a vehicle 1, a power slide door device 2 as an automatic open-close device for a vehicle is arranged, and this power slide door device 2 has a slide door 3 as an open-close component. This slide door 3 is movable along a slide rail 4 fixed onto the side of the vehicle 1 between its fully opened position shown in solid line and its fully closed position shown in dashed line, namely, this slide door 3 is attached to the vehicle 1 so as to freely open and close. Further, when a passenger gets on or off a second seat 5 or a third seat 6 arranged in the cabin, or puts cargos thereinto, the slide door 3 is opened to its fully opened position.

Figure 2:
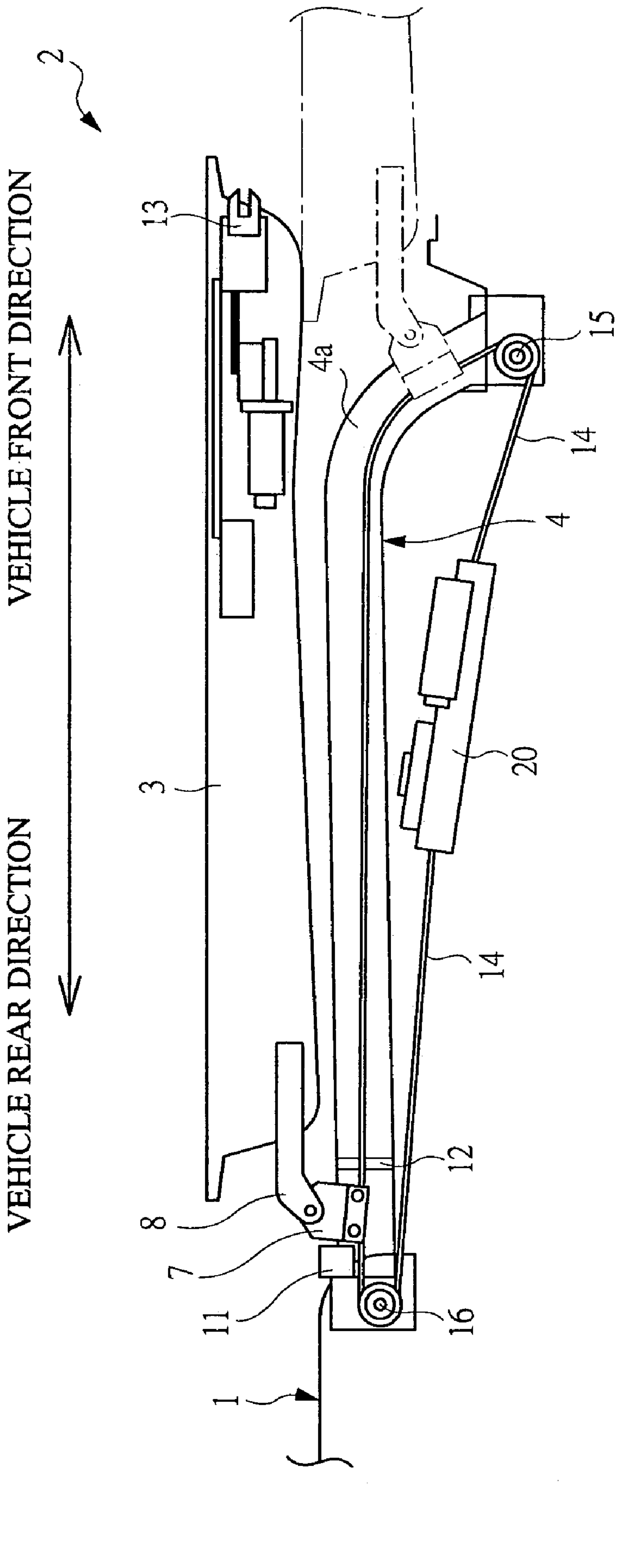
FIG. 2 is an enlarged top view showing the details of the power slide door device shown in FIG. 1.

As shown in FIG. 2, into the slide rail 4, a roller assy 7 that moves along the slide rail 4 is assembled, and to this roller assy 7, the tip part of an arm 8 fixed to the slide door 3 is attached so as to freely slide. Thereby, the slide door 3 is guided via the arm 8 and the roller assy 7 by the slide rail 4 so as to move in the front and rear directions of the vehicle. Further, to the vehicle rear end of the slide rail 4, a stopper rubber 11 and a checker 12 are arranged, and when the slide door 3 is opened to its fully opened position, the roller assy 7 is kept between the stopper rubber 11 and the checker 12, thereby the movement thereof is prevented.

In the vehicle front end of the slide rail 4, a curved portion 4*a* is formed, and the roller assy 7 is guided by this curved portion 4*a*, thereby the slide door 3 retracted and closed into the inside of the vehicle 1 so as to be contained in the same surface as the side surface of the vehicle 1. Further, to the slide door 3, a door lock 13 is arranged, and the slide door 3 that is in its fully closed position is kept by being locked by this door lock 13.

To the slide door 3, a cable 14 is attached via the arm 8 and the roller assy 7. This cable 14 is guided to the front side and the rear side of the vehicle 1 toward reverse pulleys 15 and 16 arranged at both the ends of the slide rail 4, and by pulling one side of this cable 14, open-close actions of the slide door 3 are carried out. Further, so as to drive this cable 14, a slide actuator 20 is arranged to this power slide door device 2. The slide actuator 20 is fixed onto the vehicle 1 around the center of the slide rail 4, and the cable 14 is guided to the inside of the slide actuator 20 via the reverse pulleys 15 and 16 from the vehicle front side and the vehicle rear side.

Figure 3:
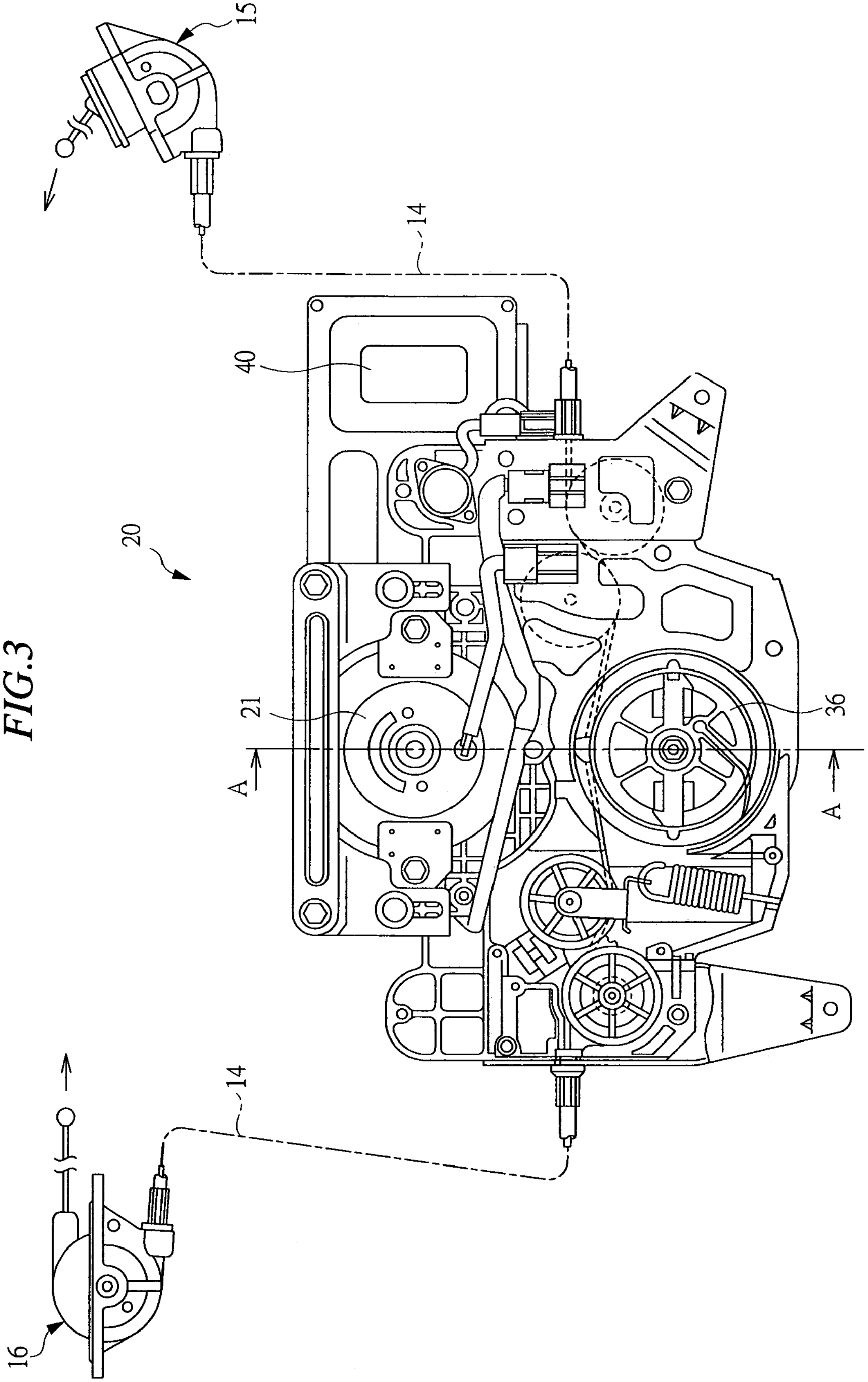
FIG. 3 is a top view showing the details of a slide actuator shown in FIG. 1.
Figure 4:
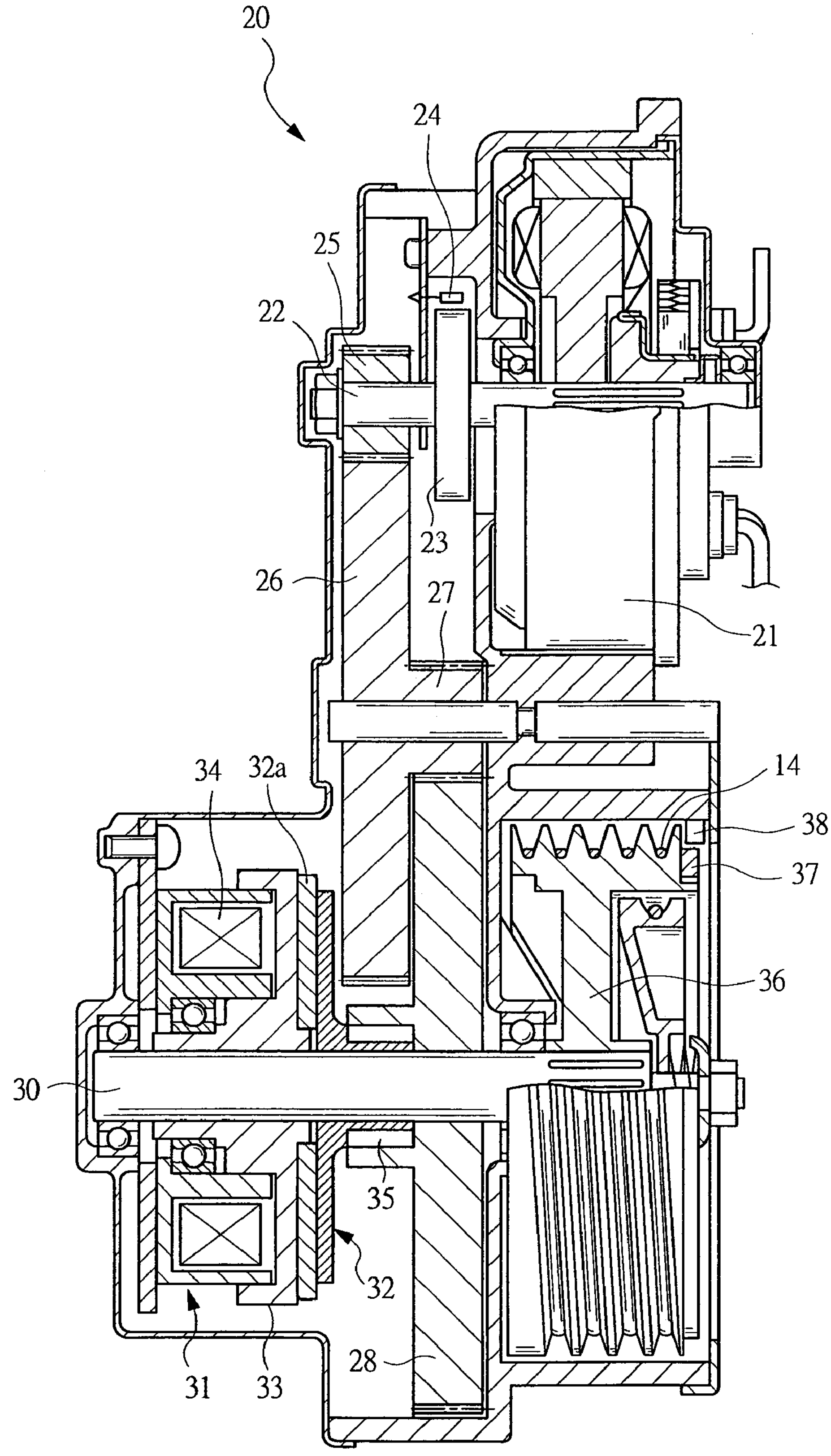
FIG. 4 is a cross sectional view along A-A in FIG. 3.
Figure 5:
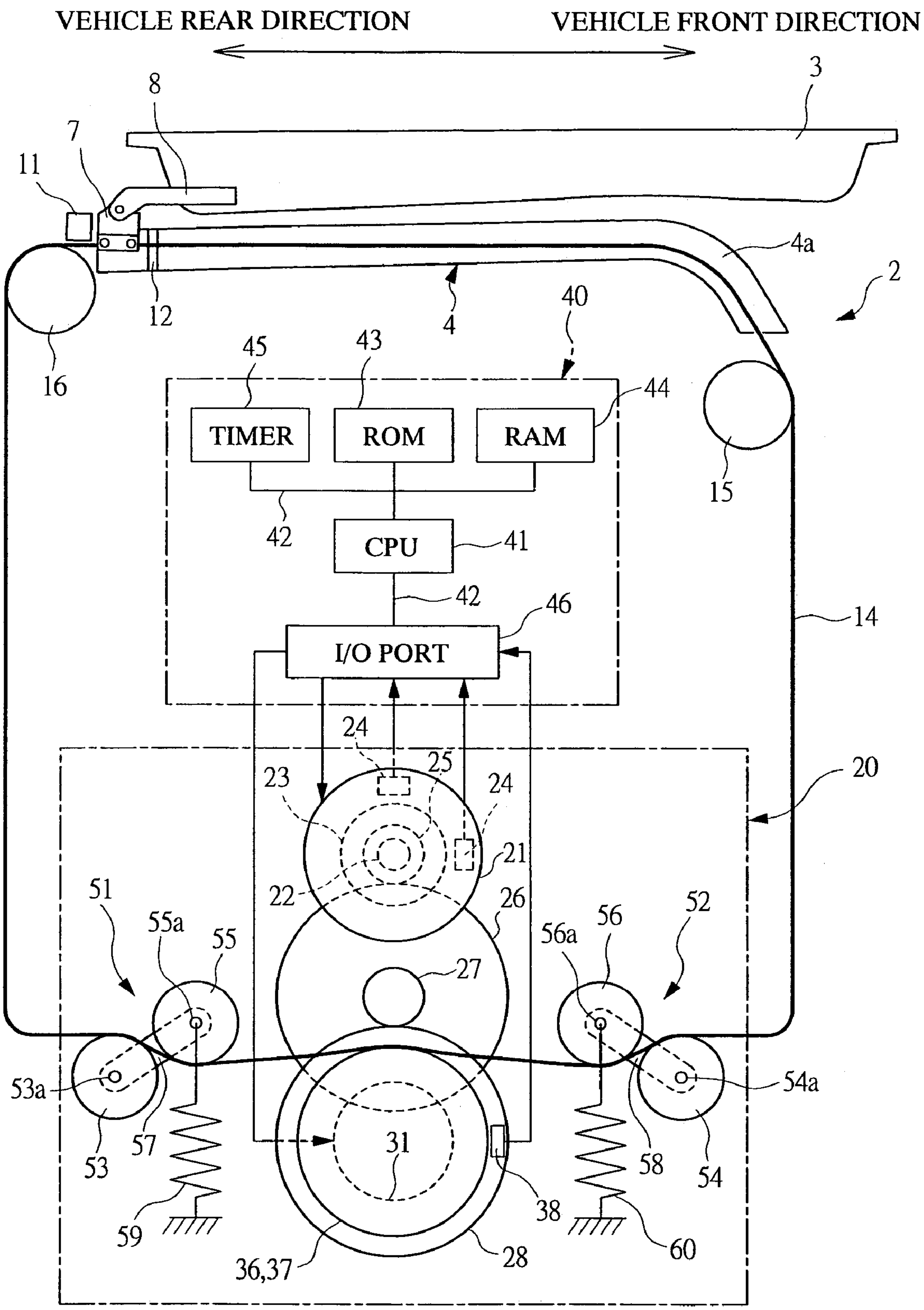
FIG. 5 is an explanatory figure showing the control mode of the power slide door device shown in FIG. 1.

FIG. 3 is a top view showing the details of the slide actuator shown in FIG. 1, and FIG. 4 is a cross sectional view along A-A in FIG. 3, and FIG. 5 is an explanatory figure showing the control mode of the power slide door device shown in FIG. 1.

As shown in FIG. 3 and FIG. 4, to the slide actuator 20, an electric motor 21 is arranged as a driving unit. This electric motor 21 is operated when voltage is applied between power source terminals not illustrated therein, namely when current is supplied, namely, a rotating shaft 22 rotates. Further, by changing the direction of the current supplied between power source terminals not illustrated therein, the rotating shaft 22 may be rotated in its normal direction and its reverse direction.

To the rotating shaft 22, a multi pole magnetized magnet 23 where 10 poles are magnetized is fixed, and near the rotation orbit of this multi pole magnetized magnet 23, two Hall IC's 24 are arranged with a phase difference of 90 degrees to each other. These Hall IC's 24 may output a pulse signal Ps at every change of magnetic field when the multi pole magnetized magnet 23 rotates, and when the rotating shaft 22 makes its one rotation, from the Hall IC's 24, pulse signals Ps for 10 cycles where phases are displaced by 90 degrees are output. By the way, a Hall IC is a sensor that converts a change of magnetic field into voltage.

The output of this electric motor 21, namely, the driving force thereof is transmitted via a driving gear 25, a large diameter spar gear 26 and a small diameter spar gear 27 to a driven gear 28. Namely, the driving gear 25 is fixed to the rotating shaft 22, and this driving gear 25 is engaged with the large diameter spar gear 26, and the small diameter spar gear 27 that is so formed as to rotate coaxially and integrally with the large diameter spar gear 26 is engaged with the driven gear 28. Thereby, the rotation of the rotating shaft 22 is decelerated and then transmitted to the driven gear 28.

In this slide actuator 20, an output shaft 30 is arranged so as to freely rotate, and the driven gear 28 is supported so as to freely rotate relatively with the output shaft 30. Further, between the driven gear 28 and the output shaft 30, namely, between the electric motor 21 and the slide door 3, an electromagnetic clutch 31 as a clutch is arranged.

The electromagnetic clutch 31 is of so-called abrasion type, and has an armature 32*a* of a driving disk 32 and a driven disk 33 and a coil portion 34 that are arranged with their abrasion surfaces facing one another. The driving disk 32 is connected to the driven gear 28 via a spline joint 35, and rotates integrally with the driven gear 28 and is movable to the driven gear 28 in the shaft direction thereof. On the other hand, the driven disk 33 is fixed to the output shaft 30, and rotates integrally with the output shaft 30. The coil portion 34 is arranged behind the driven disk 33, and generates electromagnetic force when current is supplied thereto, and pulls the armature 32*a* of the driving disk 32 closer to the driven disk 33. Accordingly, when current is supplied to the coil portion 34, the abrasion surfaces of the respective disks 32 and 33 are pressure connected and the electromagnetic clutch 31 gets in its connected status. Namely, in the connected status, the driven gear 28 and the output shaft 30 become fixed to each other via the respective disks 32 and 33, and force transmission becomes available. On the other hand, when the supply of current to the coil portion 34 is stopped, the abrasion force between the respective disks 32 and 33 decreases and the electromagnetic clutch 31 gets in its disconnected status, and the connection between the driven gear 28 and the output shaft 30 is disconnected.

As shown in FIG. 3, in the slide actuator 20, a drum 36 on which a spiral guide slot is formed is arranged, and the cable 14 guided by the slide actuator 20 is wound around this drum 36 several times along the guide slot. This drum 36 is fixed to the output shaft 30, and rotates integrally with this output shaft 30. Namely, this drum 36 is connected to the electric motor 21 via the gears 25 to 28, the electromagnetic clutch 31 and the output shaft 30, and is rotated by the electric motor 21. Further, when the drum 36 is rotated, either the vehicle front side or the vehicle rear side of the cable 14 is wound up, and the slide door 20 carries out open-close actions. Accordingly, when the electric motor 21 is rotated in its normal direction and the drum 36 is rotated in its opening direction that is clockwise in FIG. 3, the cable 14 at the vehicle rear side is wound up by the drum 36 and the slide door 3 is pulled by the cable 14 and moves toward its fully opened position. On the contrary, when the electric motor 21 is rotated in its reverse direction and the drum 36 is rotated in its closing direction that is counterclockwise in FIG. 3, the cable 14 at the vehicle front side is wound up by the drum 36 and the slide door 3 is pulled by the cable 14 and moves toward its fully closed position. In this manner, the slide door 3 is driven by the electric motor 21.

According to the structure explained above, the current supplied to the electric motor 21 is controlled, thereby open-close actions of the slide door 3 may be controlled, and, the current supply to the electromagnetic clutch 31 is controlled, thereby the connection between the electric motor 21 and the slide door 3 may be switched to its connected status and its disconnected status.

To the side of the drum 36, a multi pole magnetized magnet 37 where 10 poles are magnetized is attached, and near the rotation orbit of this multi pole magnetized magnet 37, a Hall IC 38 is arranged. This Hall IC 38 may output a pulse signal at every change of magnetic field when the multi pole magnetized magnet 37 rotates, and when the drum 36 makes its one rotation, from the Hall IC 38, pulse signals for 10 cycles are output.

As shown in FIG. 5, in this slide actuator 20, an electronic control unit, namely, an ECU 40 is arranged to control the electric motor 21 and the electromagnetic clutch 31. To this ECU 40, a battery loaded in the vehicle 1 but not illustrated therein is connected, and the ECU operates by electric power supplied from this battery.

The ECU 40 is equipped with a micro processor (hereinafter, referred to as CPU 41), and to this CPU 41, a ROM 43, a RAM 44, a timer 45 and an I/O port 46 are connected via a bus line 42. In the ROM 43, control programs, calculation equations and map data and the likes are stored, and the RAM 44 may temporarily store data processed by the CPU 41. Further, to the I/O port 46, the Hall IC's 24 and 38, and a slide door open-close switch (hereinafter, referred to as open-close switch) not illustrated therein are connected, and pulse signals or command signals from these components are input via the I/O port 46 to the CPU 41.

The ECU 40 may detect rotation speeds of the electric motor 21, i.e., the move speed Vo in the opening direction of the slide door 3 and the move speed Vc in the closing direction thereof, according to the cycle Tp of pulse signals Ps input from the Hall IC 24, and detect the rotation direction of the electric motor 21, i.e., the move direction of the slide door 3 on the basis of the occurrence timing of these pulse signals. Further, the ECU 40 detects that the cycle Tp of the pulse signals Ps reaches a preset threshold value $T\alpha$ or below, and thereby may judge whether the move speeds Vo and Vc of the slide door 3 reaches a preset specified speed, i.e., the move speed $V\alpha$ or higher.

Further, the ECU 40 analyzes the rotation angle of the drum 36 by the pulse signals input from the Hall IC 38, and may detect the position of the slide door 3 on the basis of this rotation angle. This is made by that the multi pole magnetized magnet 37 is magnetized so as to generate a reference pulse signal for the ECU 40 to recognize the reference position of the slide door 3 at the Hall IC 38, and pulse signals are increased and decreased from the reference position of the slide door 3 based on this reference pulse. By the way, the reference position may be the fully opened position or the fully closed position of the slide door 3, or plural reference positions may be arranged too. Further, the ECU 40 may detect the lapsed time from a specified time point by the timer 45. By the way, the position of the slide door 3 may be detected not only by this Hall IC 38 but also by a resolver or a rotary encoder and the like.

Further, the ECU 40 may recognize that the slide door 3 stops at the intermediate position between its fully opened position and its fully closed position, from the detected move speeds Vo and Vc of the slide door 3 and the position of the slide door 3. When the ECU 40 as a stop time detecting unit recognizes that the slide door 3 stops at the intermediate position, it counts the lapsed time from the stop of the slide door 3 at the intermediate position. Namely, the ECU 40 may detect the stop time Ts of the slide door 3 that stops at the intermediate position. Further, the ECU 40 may judge whether this stop time Ts becomes a specified time or more, i.e., a preset protection action start time $T\beta$ (10 minutes in the present embodiment) or more.

To the I/O port 46, the electric motor 21 and the electromagnetic clutch 31 are further connected, and the CPU 41 calculates input signals from the Hall IC's 24 and 38 and the open-close switch according to the control program stored in the ROM 43, and thereby executes the driving control of the electric motor 21 and the switching control of the electromagnetic clutch 31.

The driving control of the electric motor 21 by the ECU 40 as a control unit is carried out by Pulse Width Modulation (PWM) control. In the PWM control, the voltage to be applied to the portion between power supply terminals not illustrated therein of the electric motor 21 is intermittently applied according to the pulse width of pulse having a specified carrier frequency, and by changing this pulse width, it is possible to adjust the voltage duty ratio, i.e., the voltage value to be applied to the electric motor 21. Therefore, the ECU 40, by changing the voltage duty ratio to be applied to the electric motor 21, i.e., the driving duty ratio, may control the output, i.e., the driving force of the electric motor 21. Further, the ECU 40, by reversing the high potential side and the low potential side of the voltage to be applied to the portion between the power supply terminals of the electric motor 21, may switch the directions of the current to be supplied to the electric motor 21. Namely, the ECU 40 may switch the rotation direction of the electric motor 21 to its normal rotation and its reverse rotation.

The ECU 40, by changing the duty ratio of the voltage to be applied to the electric motor 21, may switch the actions of the electric motor 21 to its automatic open-close mode and its low driving force mode. The ECU 40 as an automatic open-close mode setting unit, in the automatic open-close mode, may set the driving force of the electric motor 21 enough to open and close the slide door 3 whether the vehicle 1 is at its level status or its inclined status. On the other hand, the ECU 40 as a low driving force setting unit, in the low driving force mode, may set the driving force of the electric motor 21 as weak as insufficient to move the slide door 3 when the vehicle 1 is at level. By the way, when the vehicle 1 is inclined by a specified angle or more in the opening and closing direction of the slide door 3, the driving force of the electric motor 21 in the low driving force mode may be set so as to slightly support the move of the slide door 3 toward the downward side of the inclination.

Further, when the ECU 40 operates the electric motor 21 in the low driving force mode, the ECU counts the lapsed time from the start of the actions thereof, i.e., an action time Tr. And the ECU may judge whether the action time Tr becomes a preset speed judgment time Tj or more.

Furthermore, the ECU 40 as a clutch control unit controls the current supply to the coil portion 34 of the electromagnetic clutch 31, thereby may switch the electromagnetic switch 31 to its connected status and its disconnected status.

As shown in FIG. 5, between the drum 36 and the two reverse pulleys 15 and 16, tensioners 51 and 52 are arranged respectively, and remove slackness of the cable 14 and keep the tension thereof always within a specified range. The tensioners 51 and 52 comprise fixed pulleys 53 and 54 and moving pulleys 55 and 56, and the fixed pulleys 53 and 54 and the moving pulleys 55 and 56 are interconnected by interconnecting components 57 and 58. Central shafts 53*a* and 54*a* of the fixed pulleys 53 and 54 are fixed to the slide actuator 20, on the other hand, central shafts 55*a* and 56*a* of the moving pulleys 55 and 56 are formed in the interconnecting components 57 and 58, and the moving pulleys 55 and 56 rotate and also freely slide around the central shafts 53*a* and 54*a* of the fixed pulleys 53 and 54. Further, to the central shafts 55*a* and 56*a* of the moving pulleys 55 and 56, other end of tension springs 59 and 60 whose one end is fixed is attached, and the moving pulleys 55 and 56 press the cable 14 arranged between the fixed pulleys 53 and 54, and may give the cable 14 a specified tension to be determined by the tension springs 59 and 60. In this manner, by the tensioners 51 and 52, it is possible to absorb slackness in the cable 14 that occurs just after the drum 36 is rotated by the electric motor 21, and slackness in the cable 14 that occurs when the roller assy 7 passes the curved portion 4*a* of the slide rail 4.

Next, actions of the power slide door device 2 of such a structure as described above are explained hereinafter.

When the open-close switch is operated by a driver when the slide door 3 is in its fully closed status, and a command signal to open the slide door 3 is input to the ECU 40, the ECU 40 makes the slide door 3 carry out its automatic opening action. This automatic opening action is carried out in the following procedures.

First, the ECU 40 supplies current to the coil portion 34 of the electromagnetic clutch 31 and switches the electromagnetic clutch 31 to its connected status. Next, the ECU makes the electric motor 21 into its automatic open-close mode and rotate the electric motor in its normal rotation direction, i.e., its opening direction and rotates the drum 36 in its opening direction. Thereby, the vehicle rear side of the cable 14 is wound up by the drum 36, and the slide door 3 is pulled by the cable 14 and starts moving toward its fully opened position. At this moment, the ECU 40 starts the detection of the move direction and the move speed Vo of the slide door 3 by the pulse signal Ps from the Hall IC 24, and starts the detection of the position of the slide door 3 by the pulse signal from the Hall IC 38. Then, when the roller assy 7 goes over the checker 12 and the slide door 3 moves to its fully opened position, the current supply is cut off and the electric motor 21 is stopped, then, the electromagnetic clutch 31 is switched to its disconnected status.

On the contrary, when the open-close switch is operated by the driver when the slide door 3 is in its fully opened status, and a command signal to close the slide door 3 is input to the ECU 40, the ECU 40 makes the slide door 3 carry out its automatic closing action. This automatic closing action is carried out in the following procedures.

First, the ECU 40 supplies current to the coil portion 34 of the electromagnetic clutch 31 and switches the electromagnetic clutch 31 to its connected status. Next, the ECU makes the electric motor 21 into its automatic open-close mode and rotate the electric motor in its reverse rotation direction, i.e., its closing direction and rotates the drum 36 in its closing direction. Thereby, the vehicle front side of the cable 14 is wound up by the drum 36, and the slide door 3 is pulled by the cable 14 and starts moving toward its fully closed position. At this moment, in the same manner as in the automatic opening action, the ECU 40 starts the detection of the move direction and the move speed Vc of the slide door 3. Then, when the slide door 3 moves to its fully closed position, the current supply is cut off and the electric motor 21 is stopped, then, the slide door 3 is kept at its fully closed position by the door lock 13, and the electromagnetic clutch 31 is switched to its disconnected status.

This power slide door device 2 may carry out automatically the open-close operation of the slide door 3 by the above automatic open-close actions, i.e., the automatic opening action and the automatic closing action, and also may carry out the open-close operation of the slide door 3 manually. Namely, when the slide door 3 gets in its fully opened position or its fully closed position, the electromagnetic clutch 31 is made into its disconnected status, and the drum 36 may easily rotate also by input from the slide door 3 side, and the slide door 3 may easily opened and closed manually.

Further, this power slide door device 2 may stop the slide door 3 at the intermediate position between the fully opened position and the fully closed position, by operating the open-close switch once again when the slide door 3 is opening or closing by the automatic opening action or the automatic closing action. And, when the slide door 3 is stopped at the intermediate position, even if the vehicle 1 is inclined in the open-close direction of the slide door 3, the power slide door device keeps the electromagnetic clutch 31 at its connected status, in order to prevent the slide door 3 that is stopped at the intermediate position from moving toward the downward side of the inclination owing to its own weight. Namely, it keeps the electromagnetic clutch 31 at its connected status and prevents the drum 36 from easily rotating, thereby keeps the slide door 3 that stops at the intermediate position at the intermediate position.

Figure 6:
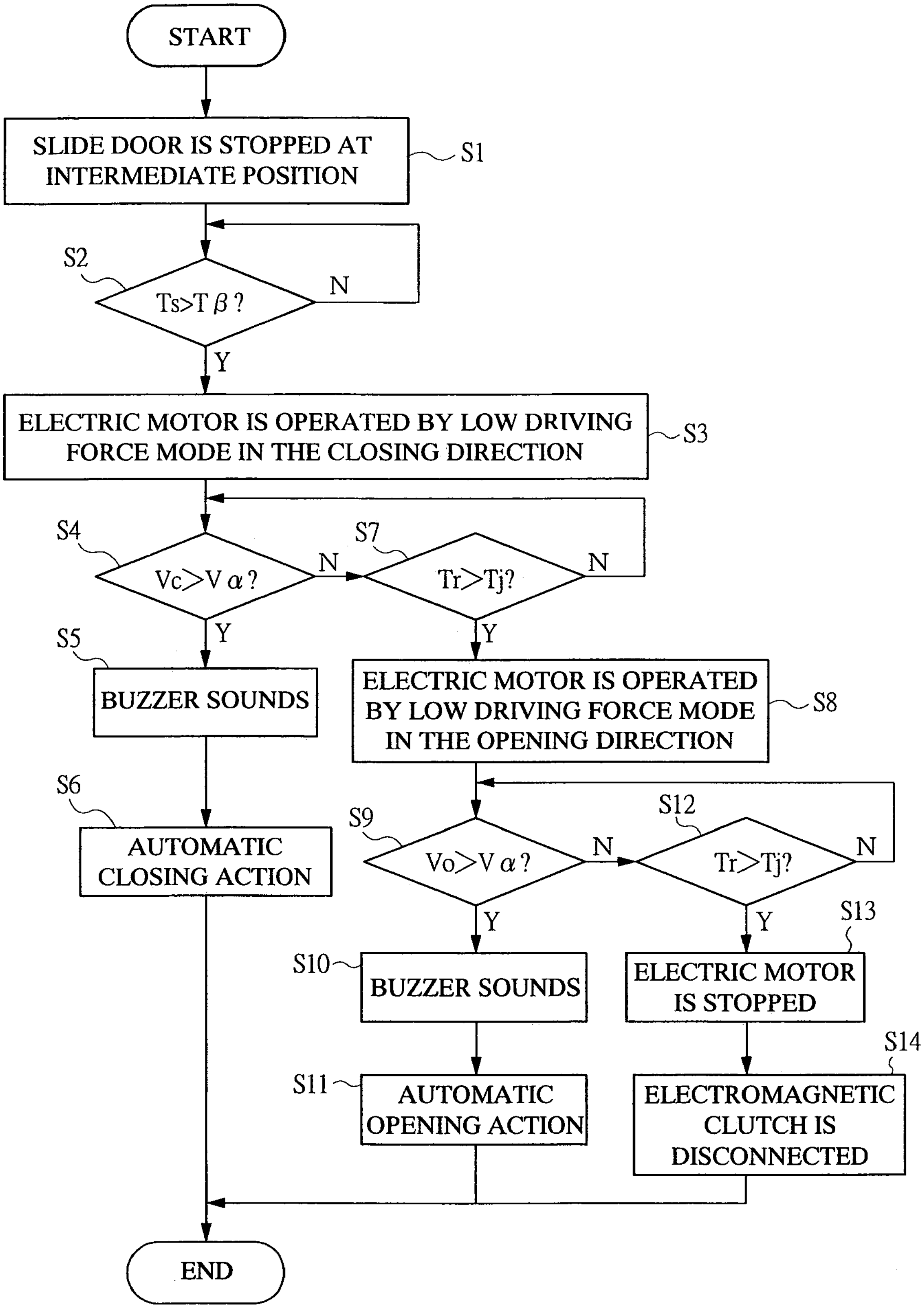
FIG. 6 is a flow chart showing the control procedures of battery protection actions in the power slide door device shown in FIG. 1.
Figure 7:
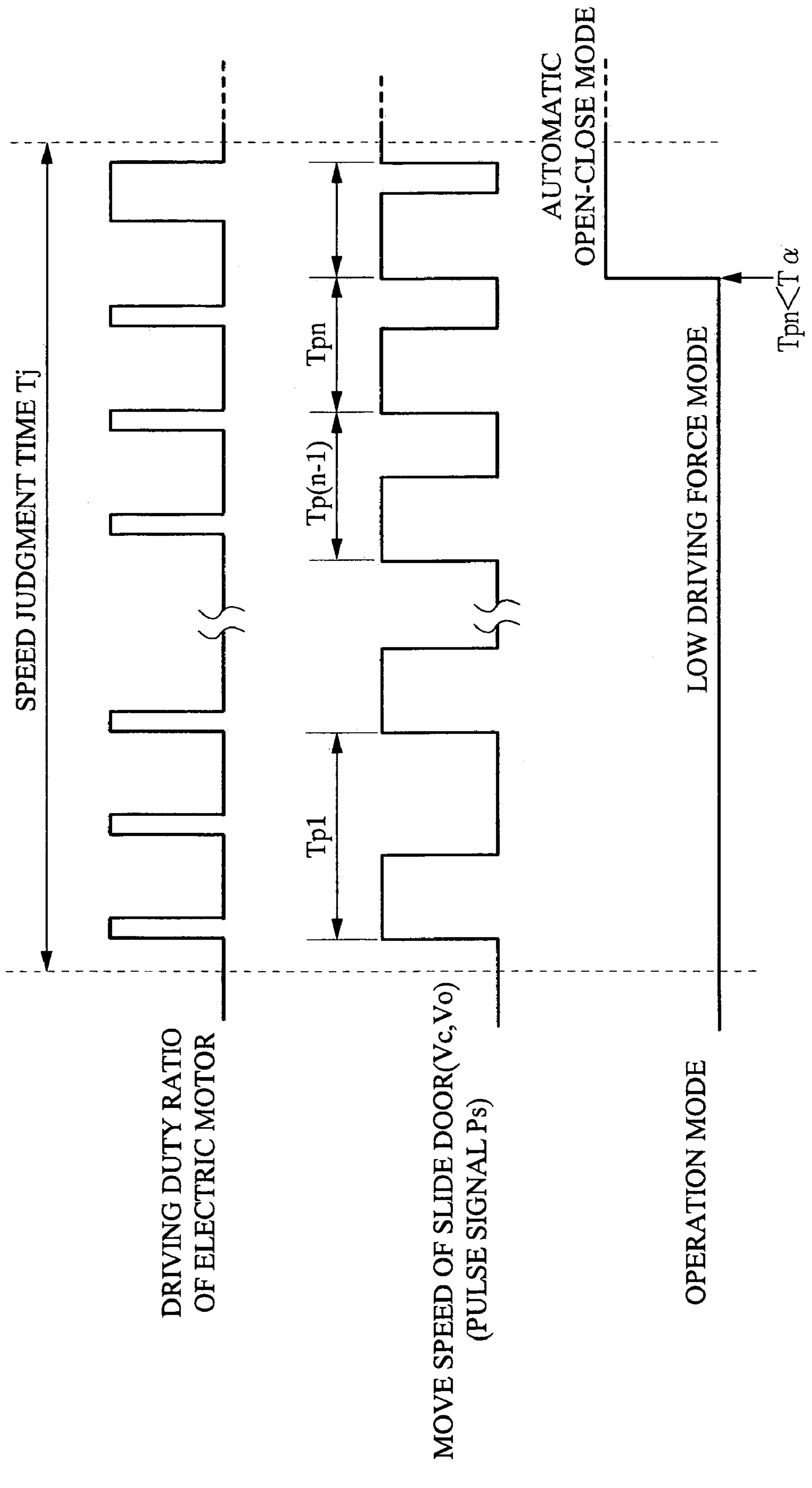
FIG. 7 is an explanatory figure showing the control timing in battery protection actions.
Figure 8:
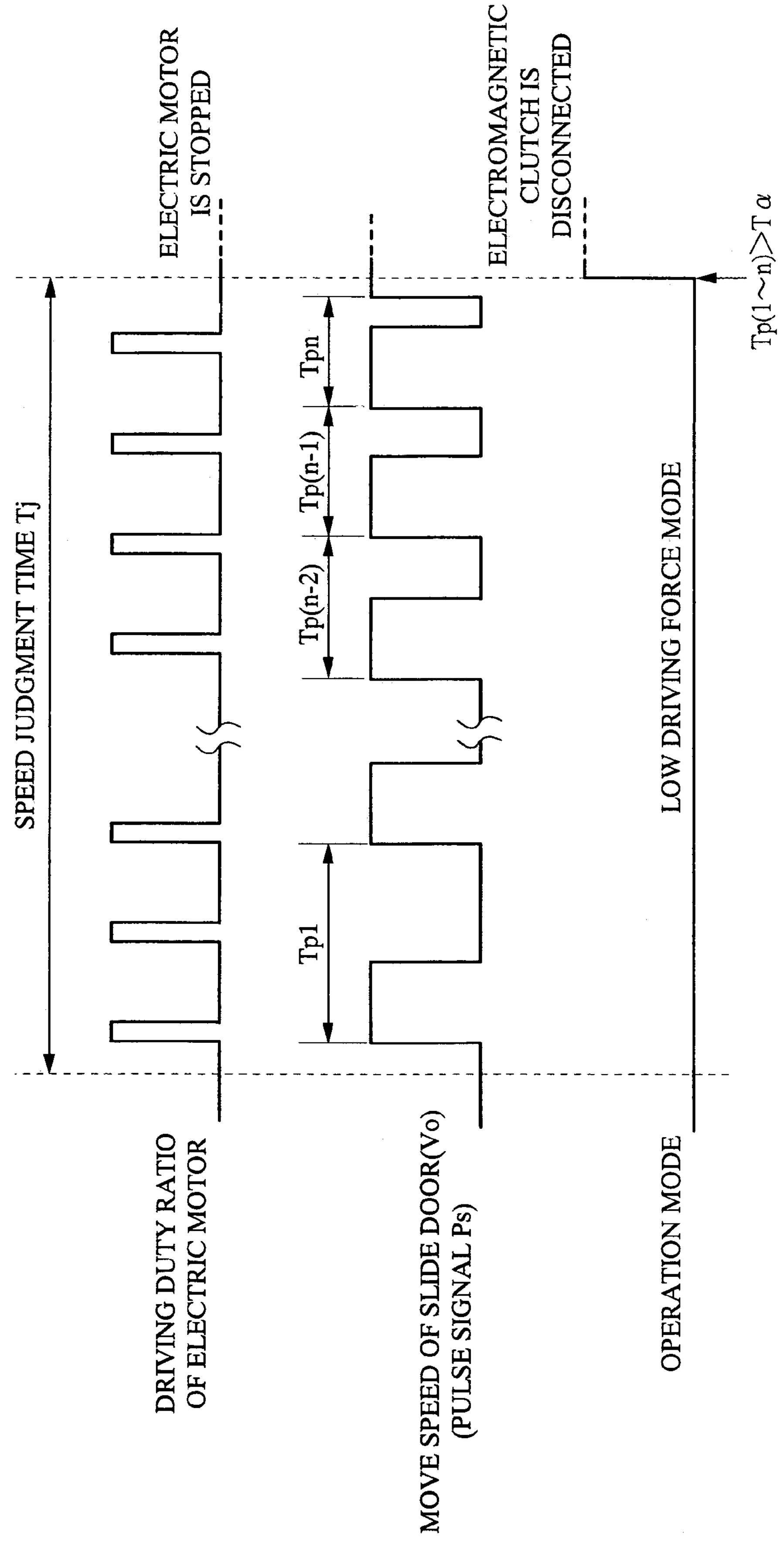
FIG. 8 is an explanatory figure showing the control timing in battery protection actions.

FIG. 6 is a flow chart showing the control procedures of battery protection actions in the power slide door device shown in FIG. 1. Further, FIG. 7 and FIG. 8 are explanatory figures showing the control timing in battery protection actions.

In this power slide door device 2, when a specified time or more, i.e., a protection action start time Tβ (10 minutes in the present embodiment) or more elapses after the slide door 3 stops at the intermediate position, a battery protection action is carried out. By reference to the flow chart shown in FIG. 6, the control procedures of this battery protection action are explained hereinafter.

First, when the open-close switch is operated once again while the slide door 3 is working in the automatic opening action or the automatic closing action, in step S1, the slide door 3 temporarily stops at the intermediate position, and the ECU 40 starts counting, i.e., detecting a stop time Ts. Next, in step S2, it is judged whether the stop time Ts has become the protection action Tβ or more. And if it is judged that the stop time Ts has become the protection action start time Tβ or more in the step S2, then in step S3, the low driving force mode is set, and the electric motor 21 is operated in the closing direction by low driving force. Namely, when the slide door 3 stops at the intermediate position for the protection action start time Tβ or more, the electric motor 21 is operated by low driving force in the closing direction, i.e., the direction to drive the slide door 3 toward its fully closed position, and low driving force working in the closing direction is given to the slide door 3.

Next, in step S4, it is judged whether the move speed Vc of the slid door 3 in the direction toward the fully closed position has become a movable speed Vα or higher. Herein, the movable speed Vα is a preset comparative value for judging whether the slide door 3 has moved. And, when it is judged that the move speed Vc is the movable speed Vα or higher in the step S4, a buzzer not illustrated therein sounds in step S5, then in step S6, the electric motor 21 is operated in the closing direction in the automatic open-close mode, and by the automatic closing action, the slide door 3 moves toward the fully closed position. Namely, as shown in FIG. 7, when it is detected that the cycle Tp of the pulse signal Ps, i.e., the n-th cycle Tpn from the setting of the low output mode becomes the threshold value Tα or below and the move speed Vc of the slide door 3 in the low driving force mode becomes the movable speed Vα or higher, the mode is switched to the automatic open-close mode and the slide door 3 is automatically closed. Herein, the instance where the move speed Vc is judged to be the movable speed Vα or higher in the step S4 is the instance where the vehicle 1 is so inclined that the closing direction side, i.e., the vehicle front side of the slide door 3 is at the downward side, and in such an instance, the slide door 3 is automatically operated by the automatic closing action toward the fully closed position to become the downward side of the inclination. And when the slide door 3 reaches the fully closed position by the automatic closing action, the electromagnetic clutch 31 is switched to its disconnected status. Namely, the electric motor 21 is operated in the closing direction by low driving force, and it is detected that the move speed Vc of the slide door 3 becomes the movable speed Vα or higher, thereby it is judged that the vehicle 1 is inclined in the closing direction, and in this instance, the slide door 3 is moved to the downward side of the inclination, thereby uncomfortable feeling to passengers and the likes is reduced, and the slide door 3 is moved to the fully closed position, and in a status where the slide door 3 will not close owing to its own weight, the electromagnetic clutch 31 is switched to its disconnected status.

As described above, when the vehicle 1 is inclined in the open-close direction of the slide door 3, the slide door 3 that has stopped at the intermediate position over the specified time is automatically operated toward the downward side of the inclination, as a consequence, the slide door 3 will not move against the inclination, namely, toward the upward side of the inclination, and will not start moving when the vehicle 1 is in its level status, therefore, it is possible to improve the operational feeling of this power slide door device 2, without causing uncomfortable feeling to passengers and the likes.

Further, when the vehicle 1 is inclined in the open-close direction of the slide door 3, the slide door 3 that has stopped at the intermediate position over the specified time is automatically operated toward the downward side of the inclination, as a consequence, in a status where the slide door 3 will not close owing to its own weight, it is possible to switch the electromagnetic clutch 31 to its disconnected status, and thereby reduce the burden of the battery.

On the other hand, when the move speed Vc is judged to be the movable speed Vα or below in the step S4, it is judged whether the action time Tr has become the speed judgment time Tj or more in step S7. And, in the step S7, if the action time Tr is the speed judgment time Tj or more, the rotation direction of the electric motor 21 is reversed in step S8, namely, the electric motor is operated in the opening direction in the low driving force mode, and low driving force in the opening direction is given to the slide door 3. Namely, by the electric motor 21 that operates in the closing direction in the low driving force mode, when the move speed Vc of the slide door 3 is not made into the movable speed Vα or higher within the speed judgment time Tj, it is judged that the vehicle 1 is at its level status or inclined so that the opening direction side, i.e., the vehicle rear side is at the downward side at the specified inclined angle or more, and the operating direction of the electric motor 21 is reversed. By the way, in the step S7, if its is judged that the action time Tr is the speed judgment time Tj or below, the procedure goes back to the step S4, and it is judged once again whether the move speed Vc of the slide door 3 has become the movable speed Vα or higher.

Next, in step S9, it is judged whether the move speed Vo of the slide door 3 in the direction toward the fully opened position has become the movable speed Vα or higher. And in the step S9, if it is judged that the move speed Vo of the slide door 3 in the direction toward the fully opened position is the movable speed Vα or higher, the buzzer not illustrated therein sounds in step S10, then in step S11, the electric motor 21 is operated in the opening direction in the automatic open-close mode, and as shown in FIG. 7, the slide door 3 moves toward the fully opened position by the automatic opening action. Herein, the instance where the move speed Vo is judged to be the movable speed Vα or higher in the step S9 is the instance where the vehicle 1 is so inclined that the opening direction side, i.e., the vehicle rear side of the slide door 3 is at the downward side, and in such an instance, the slide door 3 is automatically operated by the automatic opening action toward the fully opened position to become the downward side of the inclination. And when the slide door 3 reaches the fully opened position by the automatic opening action, the electromagnetic clutch 31 is switched to its disconnected status. In this manner, when the slide door 3 is not moved even if the electric motor 21 is operated to the closing direction by the low driving force, namely, even if the move speed Vc in the direction toward the fully closed position is not the movable speed Vα or higher, the operating direction of the electric motor 21 is reversed, thereby, when the move speed Vc is the movable speed Vα or higher, it is judged that the vehicle 1 is inclined in the opening direction, and the slide door 3 is automatically opened toward the opening direction. Accordingly, when the vehicle 1 is inclined in the opening direction, the slide door 3 moves to the downward side of this inclination, consequently, it is possible to move the slide door 3 to the fully opened position without causing uncomfortable feeling to passengers and the likes. Then, at the fully opened position, the slide door 3 will not close owing to its own weight, and in this status, the electromagnetic clutch 31 is switched to its disconnected status.

In this manner, when the move speed Vc of the slide door 3 is not made into the movable speed Vα or higher even if the electric motor 21 is operated to the closing direction by the low driving force, the electric motor 21 is operated to the opening direction by the low driving force, consequently, even when the vehicle 1 is inclined with one side of the opening and closing directions of the slide door 3 at the downward side, it is possible to move the slide door 3 toward the downward side of the inclination.

On the other hand, in the step S9, if it is judged that the move speed Vo is the movable speed Vα or below, in step S12, it is judged whether the action time Tr has become the speed judgment time Tj or more. In the step S12, if it is judged that the action time Tr is the speed judgment time Tj or more, then in step S13, the electric motor 21 is stopped, thereafter, in step S14, the electromagnetic clutch 31 is switched to its disconnected status. Namely, as shown in FIG. 8, by the electric motor 21 that operates in the low driving force mode, whether in the opening direction or in the closing direction, when the move speeds Vc and Vo of the slide door 3 are not the movable speed Vα or higher, it is judged that the vehicle 1 is at level, namely in the status where the slide door 3 will not move owing to its own weight, and the slide door 3 is left at the intermediate position and the electromagnetic clutch 31 is switched to its disconnected status. By the way, in the step S12, if it is judged that the action time Tr is the speed judgment time Tj or below, the procedure goes back to the step S9, where it is judged once again whether the move speed Vo of the slide door 3 has become the movable speed Vα or higher.

In this manner, by the low driving force mode, whether in the opening direction or in the closing direction, when the move speeds Vc and Vo of the slide door 3 do not become the movable speed Vα or higher within the specified time, the electric motor is stopped, therefore, when the vehicle 1 is at level, it may be stopped while leaving the slide door 3 at the intermediate position. Accordingly, when the vehicle 1 is in its level status, the slide door 3 is kept at the intermediate position, therefore, it is possible to prevent the slide door from automatically opening or closing even when the vehicle 1 is in its level status, and to improve the operational feeling of this power slide door device 2.

Further, by the low driving force mode, whether in the opening direction or in the closing direction, when the move speeds Vc and Vo of the slide door 3 do not become the movable speed Vα or higher within the specified time, namely, when it is judged that the vehicle is in its level status, the electromagnetic clutch 31 is switched to its disconnected status, therefore, it is possible to reduce the burden of the battery.

In this manner, in the power slide door device 2 according to the present invention, the actions of the slide door 3 that stops at the intermediate position are controlled according to the inclined status of the vehicle 1, namely, when the vehicle 1 is inclined, the slide door is moved to the downward side of the inclination, and when the vehicle is at level, the slide door is stopped at the intermediate position as it is, therefore, it is possible to improve the operational feeling thereof, without causing uncomfortable feeling to passengers and the likes.

Further, in the power slide door device 2 according to the present invention, the slide door 3 that stops at the intermediate position over the protection action start time Tβ is prevented from moving owing to its own weight irrespective of the inclined status of the vehicle 1, and the electromagnetic clutch 31 is controlled according to the inclined status of the vehicle 1 and thereafter disconnected, therefore, it is possible to reduce the burden of the battery.

Furthermore, in the power slide door device 2 according to the present invention, and the electromagnetic clutch 31 is controlled according to the inclined status of the vehicle 1 and thereafter disconnected, as a consequence, there is no need to continuously control the electromagnetic clutch 31, therefore, it is possible to prevent abrasion, sounds, and electric noises of the electromagnetic clutch 31.

The invention is not limited to the preferred embodiment herein, but may be embodied in other specific forms without departing from the spirit or essential characteristics thereof. For example, in the present embodiment, the open-close component is the slide door 3 that may be freely opened and closed in backward and forward directions, however, the present invention is not limited to this, but in the place of this, for example, other open-close components, such as a back door that is attached to a vehicle rear end via hinges so as to freely open and close in the vehicle lateral direction and the likes, may be employed.

Further, in the present embodiment, when the move speed Vc of the slide door 3 is not the movable speed Vα or higher in the low driving force mode, the move speed Vo in the opening direction and the movable speed Vα are compared, however, in the place of this, the move speed Vo in the opening direction and the movable speed Vα may be compared in advance, and when the move speed Vo is not the movable speed Vα or higher, the move speed Vc in the closing direction and the movable speed Vα may be compared.

As explained heretofore, the present invention may be applied to the manufacture of a vehicle where an open-close component may be opened and closed automatically.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An automatic open-close device for a vehicle that has an open-close component attached to the vehicle so as to freely open and close and a driving unit that drives the open-close component and a control unit that controls the driving unit, and automatically opens and closes the open-close component, the device comprising:

a stop state detecting unit that detects a stop state of the open-close component that stops in an intermediate position between its fully opened position and its fully closed position thereof;

a low driving force mode setting unit that operates the driving unit by low driving force, when the stop state detecting unit detects that the open-close component stops in the intermediate position between the fully opened position and the fully closed position thereof; and an automatic open-close mode setting unit that makes the open-close component automatically open and close, when the move speed of the open-close component in the low driving force mode becomes a specified speed or higher within a specified time;

wherein when the vehicle is inclined in the open-close direction of the open-close component, the open-close component temporarily stops at the intermediate position and then the open-close component is automatically operated toward the downward side of the inclination.

2. The automatic open-close device for a vehicle according to claim 1, wherein in the low driving force mode, even when the driving unit is operated in either the opening direction or the closing direction, if the move speed of the open-close component is not the specified speed or higher within a specified time, the driving unit is operated in the other direction of either the opening direction or the closing direction.

3. The automatic open-close device for a vehicle according to claim 2, wherein when the driving unit in the low driving force mode cannot make the open-close component reach a specified speed or higher within a specified time in either the opening direction or the closing direction, the driving unit is stopped.

4. The automatic open-close device for a vehicle according to claim 1, wherein when the vehicle is at level, the driving force of the driving unit in the low driving force mode is set to a level insufficient to move the open-close component.

5. The automatic open-close device for a vehicle according to claim 1, wherein when the vehicle is inclined in the open-close direction of the open-close component, the driving force of the driving unit in the low driving force mode is set to a level insufficient to move the open-close component toward the downward side of the inclination.

6. The automatic open-close device for a vehicle according to claim 1, further comprising a clutch arranged between the open-close component and the driving unit, and a clutch control unit that keeps the clutch in its connected status when the open-close component is at the intermediate position, and sets the clutch in its disconnected status when the open-close component is at the fully opened position or the fully closed position, and sets the clutch in its disconnected status when the open-close component is not made to reach a specified speed or higher within a specified time in either the opening direction or the closing direction in the low driving force mode.

7. The automatic open-close device for a vehicle according to claim 2, further comprising a clutch arranged between the open-close component and the driving unit, and a clutch control unit that keeps the clutch in its connected status when the open-close component is at the intermediate position, and sets the clutch in its disconnected status when the open-close component is at the fully opened position or the fully closed position, and sets the clutch in its disconnected status when the open-close component is not made to reach a specified speed or higher within a specified time in either the opening direction or the closing direction in the low driving force mode.

8. The automatic open-close device for a vehicle according to claim 3, further comprising a clutch arranged between the open-close component and the driving unit, and a clutch control unit that keeps the clutch in its connected status when the open-close component is at the intermediate position, and sets the clutch in its disconnected status when the open-close component is at the fully opened position or the fully closed position, and sets the clutch in its disconnected status when the open-close component is not made to reach a specified speed or higher within a specified time in either the opening direction or the closing direction in the low driving force mode.

* * * * *